United States Patent
Shemer et al.

(10) Patent No.: US 11,650,890 B2
(45) Date of Patent: May 16, 2023

(54) AUTOMATIC IO STREAM TIMING DETERMINATION IN LIVE VM IMAGES

(71) Applicant: EMC IP Holding Company LLC, Hopkinton, MA (US)

(72) Inventors: Jehuda Shemer, Kfar Saba (IL); Nadav Azaria, Meitar (IL); Saar Cohen, Mishmeret (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 442 days.

(21) Appl. No.: 16/784,074

(22) Filed: Feb. 6, 2020

(65) Prior Publication Data

US 2021/0248046 A1    Aug. 12, 2021

(51) Int. Cl.
  *G06F 16/23* (2019.01)
  *G06F 11/14* (2006.01)
  *G06F 9/455* (2018.01)

(52) U.S. Cl.
  CPC ...... *G06F 11/1471* (2013.01); *G06F 16/2358* (2019.01); *G06F 9/45558* (2013.01); *G06F 2009/45562* (2013.01); *G06F 2201/80* (2013.01); *G06F 2201/82* (2013.01)

(58) Field of Classification Search
  CPC ............ G06F 11/1471; G06F 16/2358; G06F 9/45558
  See application file for complete search history.

(56) References Cited

U.S. PATENT DOCUMENTS

| | | | |
|---|---|---|---|
| 9,720,618 | B1 | 8/2017 | Panidis et al. |
| 9,917,854 | B2 | 3/2018 | Natanzon et al. |
| 9,940,205 | B2 | 4/2018 | Natanzon |
| 2010/0049930 | A1 | 2/2010 | Pershin et al. |
| 2015/0242283 | A1 | 8/2015 | Simoncelli et al. |
| 2016/0188353 | A1 | 6/2016 | Shu et al. |
| 2016/0283329 | A1* | 9/2016 | Natanzon ............ G06F 11/1464 |
| 2017/0083540 | A1* | 3/2017 | Mamluk ............. G06F 11/1451 |
| 2017/0093890 | A1 | 3/2017 | Natanzon et al. |
| 2018/0143880 | A1 | 5/2018 | Dornemann |
| 2021/0117284 | A1 | 4/2021 | Azaria et al. |
| 2021/0182150 | A1 | 6/2021 | Azaria et al. |

\* cited by examiner

*Primary Examiner* — Loc Tran
(74) *Attorney, Agent, or Firm* — Workman Nydegger

(57) ABSTRACT

One example method includes capturing IOs, adding the IOs to a journal, adding undo data to the journal for one or more locations, and using the IOs and the undo data to determine when, during a timespan defined by the journal, a backup could have been taken. This determination may involve the use of undo data which indicates what the content of a particular location was prior to the first IO directed to that location during the timespan defined by the journal.

16 Claims, 6 Drawing Sheets

Data in backup:

| Location | L1 | L2 | L3 | L4 |
|---|---|---|---|---|
| Data | Q | X | Y | Z |

600

The journal:

| Time | T0 | T1 | T2 | T3 | T4 | T5 | T6 |
|---|---|---|---|---|---|---|---|
| IO | L2=A | L2=X | L1=Q | L2=B | L3=C | L2=X | L2=D |

700

Classification:

| Time | T0 | T1 | T2 | T3 | T4 | T5 | T6 |
|---|---|---|---|---|---|---|---|
| L1 | | | | Q | | | |
| L2 | | A | X | | B | X | D |
| L3 | | | | | | C | |
| L4 | | | | | | | |

800

Color coding:

| | |
|---|---|
| | Value matches. Interval can be when backup was taken |
| | Value does not match. Interval cannot be when backup was taken |
| | Value concluded to match. Interval can be when backup was taken |
| | Unknown |

FIG. 3

Data in backup: ⟵ 600

| Location | L1 | L2 | L3 | L4 |
|---|---|---|---|---|
| Data | Q | X | Y | Z |

The journal: ⟵ 700a

| Time | T0 | T1 | T2 | T3 | T4 | T5 | T6 |
|---|---|---|---|---|---|---|---|
| IO | L2=A, Undo=W | L2=X | L1=Q, Undo=Q | L2=B | L3=C, Undo=Y | L2=X | L2=D |

Classification: ⟵ 800

| Time | T0 | T1 | T2 | T3 | T4 | T5 | T6 |
|---|---|---|---|---|---|---|---|
| L1 |  |  |  | Q |  |  |  |
| L2 |  | A | X |  | B | X | D |
| L3 |  |  |  |  | C |  |  |
| L4 |  |  |  |  |  |  |  |

New Classification: ⟵ 800a

| Time | T0 | T1 | T2 | T3 | T4 | T5 | T6 |
|---|---|---|---|---|---|---|---|
| L1 | Q |  |  | Q |  |  |  |
| L2 | W | A | X |  | B | X | D |
| L3 | Y |  |  |  | C |  |  |
| L4 |  |  |  |  |  |  |  |

Color coding:

| Pattern | Meaning |
|---|---|
| (diagonal) | Value matches. Interval can be when backup was taken |
| (reverse diagonal) | Value does not match. Interval cannot be when backup was taken |
| (cross-hatch) | Value concluded to match. Cannot happen anymore |
| (blank) | Unknown. Cannot happen anymore |

FIG. 4

AUTOMATIC IO STREAM TIMING DETERMINATION IN LIVE VM IMAGES

FIELD OF THE INVENTION

Embodiments of the present invention generally relate to data protection. More particularly, at least some embodiments of the invention relate to systems, hardware, software, computer-readable media, and methods for determining when a backup took place within a time frame specified by a journal.

BACKGROUND

A snapshot or other backup may be augmented with an IO journal that chronologically logs IOs performed for a period of time after creation of the snapshot. In this way, the snapshot can be rolled forward, using the IO operations captured in the IO journal log, to a desired point in time, thereby providing a snapshot that is fully consistent as of the desired point in time.

However, the IO journal may not provide enough information to enable a reliable determination as to when the snapshot was taken. This can be problematic in circumstances where, for example, problems possibly affecting the snapshot are known to have occurred in the system around the time the snapshot was taken. Given those problems, the snapshot may be of little or no value to the enterprise. Knowing the time when the snapshot was taken may help to avoid reliance on snapshots that may have been compromised.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 3 discloses aspects of a comparative example of a backup, journal, and classification scheme.

FIG. 4 discloses aspects of an example of a backup, journal, and classification scheme.

DETAILED DESCRIPTION OF SOME EXAMPLE EMBODIMENTS

Figure 1:
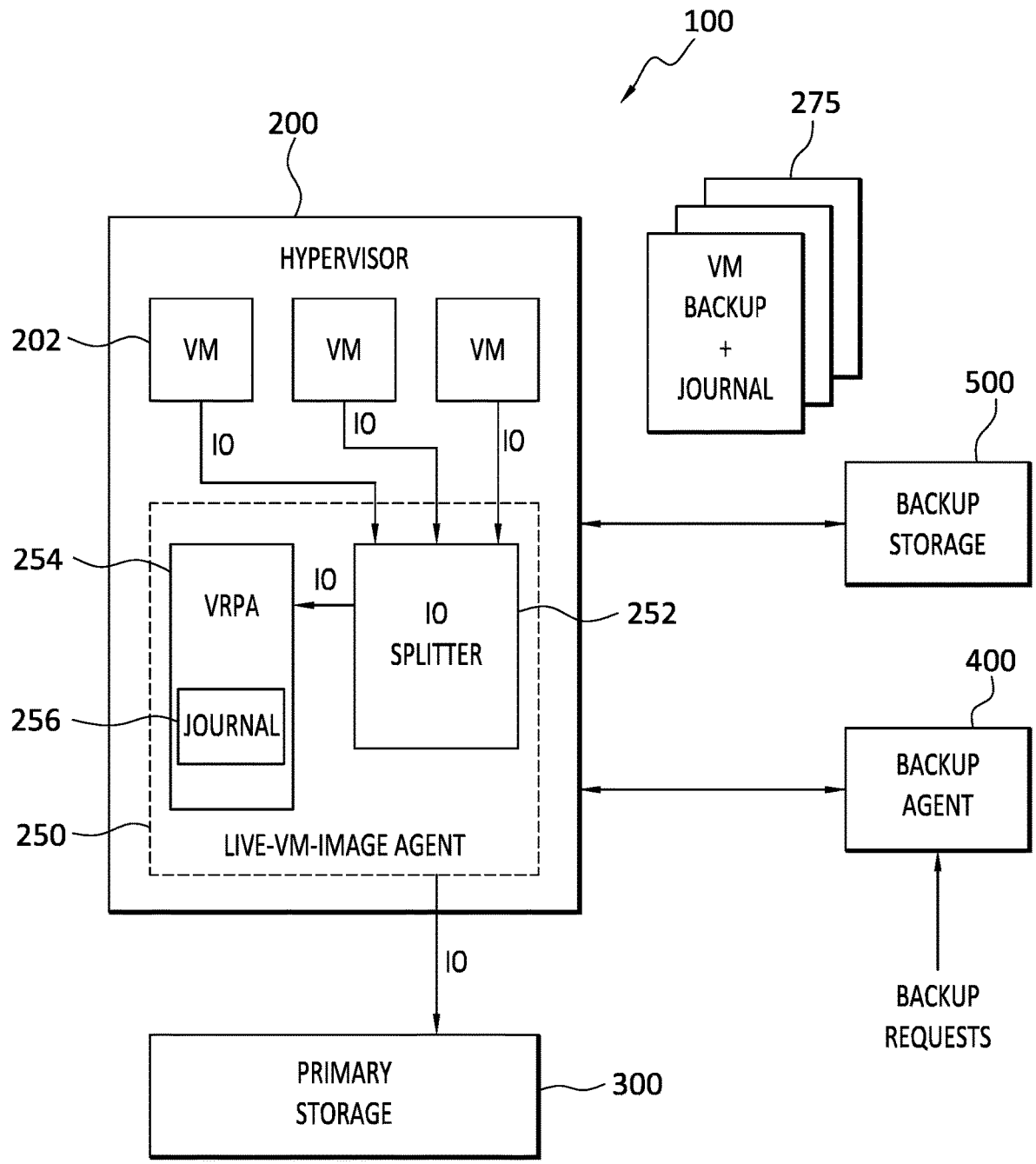
FIG. 1 discloses aspects of an example architecture and operating environment.

Embodiments of the present invention generally relate to data protection. More particularly, at least some embodiments of the invention relate to systems, hardware, software, computer-readable media, and methods for determining when a backup took place within a time frame specified by a journal.

It is noted that disclosed processes, and claimed processes, such as the capture of IOs, and any other processing and/or handling of IOs, cannot be performed in any practical way by a human. For example, the IOs may be received in a high speed data stream. Such datastreams may, for example, be on the order of 1 Gb/s to 100 Gb/s, or more. A human is simply incapable of handling such a significant amount of data in such short time periods. As another example, a journal may contain hundreds, or thousands, or more, entries and, as such, a human is incapable of creating and/or updating the journal as IOs come in. Nor could a human practically perform a comparison of data in the journal with data contained in a backup. In fact, use of human faculties, such as mental processes for example, in an attempt to perform any of the disclosed processes and claimed processes would effectively defeat the usefulness and functionality of those processes since, for example, a human cannot practically process the necessary volume of data at the necessary speed.

In general, example embodiments of the invention may involve the use of a journal of IOs that includes 'undo' information which may enable a determination to be made as to when, within a timespan defined by the journal, a backup took place. More particularly, a journal may be defined that spans a period of time during which a backup is known to have been taken. Also, during the time span defined by the journal, IOs are copied to the journal. As such, the journal comprises a record of when an IO was written, what data was written by the IO, and where the data was written. The IOs may be written to the journal in real time and/or on some other basis.

In one embodiment, the first time that an IO of 'Y' is written to the journal for a particular location, a record, is made of the data 'X' that is, the 'undo' information, that existed in that location immediately prior to the writing of the IO. Thus, knowledge of the content of that location immediately before, and after, the IO, is captured in the journal.

The journal may then be compared with the backup to determine, for example, whether, in the backup, the particular location included 'X' or 'Y.' If the particular location indicated in the backup includes 'X,' then it may be concluded that the backup took place before the IO that wrote 'Y' to that location. On the other hand, if the backup location includes 'Y,' then it may be concluded that the backup took place after the IO that wrote 'Y' to that location. Since the time of the IOs is known, and since the IOs may be spaced relatively closely together, the time when the backup was taken may be determined. On the other hand, if the particular location in the backup includes neither 'X' nor 'Y,' then the IOs subsequent to the initial IO written to the journal may be examined and compared with the backup to determine when the backup took place.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that, within a timespan defined by a journal, the particular time when a backup was taken may be determined. In an embodiment, knowledge of the time when a backup was taken may enable a determination as to when the backup was taken relative to one or more events, such as problems or system events for example. In an embodiment, knowledge of the time when a backup was taken may enable a determination to be made as to whether or not the backup should be used in a restore process and/or other process.

A. Aspects of an Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, backup and restore operations involving, among other things, the creation and/or use of one or more backups or snapshots, such as live-vm-images for example. Such backup and restore operations may include, but are not limited to, data read/write/delete operations, snapshots, data deduplication operations, data backup operations including creation of an application-consistent image-level VM backup using crash-consistent methods, data restore operations including the use of one or more live-vm-images to restore a VM to a target system or device, data cloning operations, data archiving operations, and disaster recovery operations. Various other example operations are disclosed elsewhere herein. More generally, the scope of the invention embraces any operating environment in which one, some, or all, of the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment. As well, and discussed in more detail below, some embodiments can be employed in a cloud storage environment, a customer on-premises environment, and/or any other environment in which one or more VMs may be employed.

New and/or modified data collected and/or generated, such as VM backups and one or more live-vm-images, in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage environments in connection with which embodiments of the invention may be employed include, but are not limited to, Microsoft Azure, Amazon AWS, and Google Cloud. More generally however, the scope of the invention is not limited to employment of any particular type or implementation of cloud storage.

In addition to the storage environment, the operating environment may also include one or more clients that are capable of collecting, modifying, and creating, data. As such, a particular client may employ, or otherwise be associated with, one or more instances of each of one or more applications that perform such operations with respect to data.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures and may provide the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

With particular attention now to FIG. 1, one example of an operating environment for embodiments of the invention is denoted generally at 100. In general, the operating environment 100 can take any form that will enable performance of the disclosed processes and operations. As such, the operating environment 100 is presented only by way of example, and is not intended to limit the scope of the invention. Moreover, the functional allocation disclosed in connection with the operating environment 100 is likewise presented only by way of example and, in other embodiments, the disclosed functions can be allocated amongst the disclosed entities in any other way that will still enable performance of those functions.

The example operating environment 100 may include, for example, a hypervisor 200 that communicates with primary storage 300, a backup agent 400 that may comprise software operable to create VM backups according to one or more predefined policies, and backup storage 500, which can be implemented in the form of a Dell-EMC DataDomain environment for example, which stores VM backups and their associated journals, as discussed below. While not specifically indicated in FIG. 1, the backup storage 500, backup agent 400, and primary storage 300, may all communicate with each other as well. In some embodiments, the backup agent 400 and associated backup system may be combined together with the hypervisor 200, but that is not required.

In general, the hypervisor 200 hosts, or otherwise includes, any number of VMs 202 that are desired to be protected, that is, backed up. The hypervisor 200 may be, for example, a VMWare ESXi hypervisor, but that is not required and other hypervisors may be used. One, some, or all, of the VMs 202 may host or otherwise include one or more applications that issue IOs, such as read, write, and delete, operations for example, directly and/or indirectly to the primary storage 300. The applications running on the VMs 202 can be any type of application that generates new and/or modified data, including, but not limited to, SQL, Oracle, Exchange, email applications, media applications, word processing applications, database applications, engineering applications, and financial applications, for example.

In addition to the VMs 202, the hypervisor 200 also includes a live-vm-image agent 250. In general, the live-vm-image agent 250 operates to augment each backup created by backup agent 400 by adding an I/O journal to the backup. One example embodiment of a live-vm-image agent 250 takes the form of a RecoverPoint (RP) system that may include an IO splitter 252 that runs on the hypervisor 200 and intercepts IOs issued by applications hosted by the VMs 202, as shown in FIG. 1. The live-vm-image agent 250 may also include a virtual RecoverPoint appliance (vRPA) 254 which is a virtual machine that handles the replication and data protection tasks, receives tracked IOs from the IO splitter 252, and records those IOs in a journal 256. The journal 256 may, or may not, be persistently stored in memory or storage. More generally, element 254 may comprise, or consist of, any Data Protection Appliance (DPA), and is not limited to implementation as a vRPA.

As further indicated in FIG. 1, one or more live-vm-images 275 may be created, by the live-vm-agent 250 in cooperation with the backup agent 400, that are then stored in the backup storage 500 for later retrieval and restoration to one or more targets which may, or may not, be one of the VMs 202. In general, each live-vm-image 275 includes a backup of a VM 202 as well as a journal of IOs relating to that VM. By using the backup and the journal, a VM corresponding to a particular point in time can be spun off from the corresponding live-vm-image 275 and then restored to one or more targets.

C. Aspects of an Example Live-vm-Image

Figure 2:
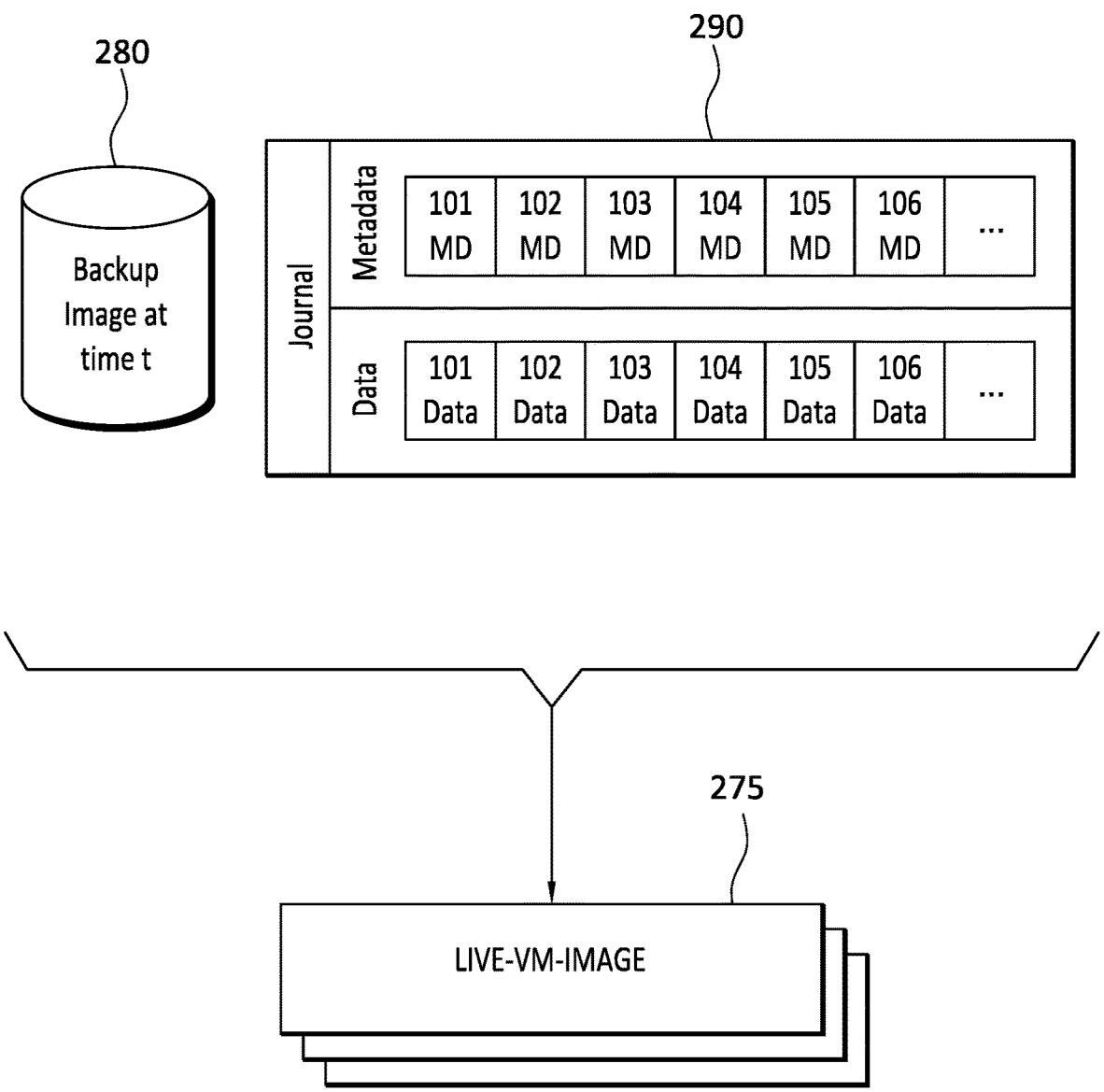
FIG. 2 discloses aspects of an example journal.

With continued reference to FIG. 1, and referring now to FIG. 2 as well, further details are provided concerning some example live-vm-images, such as the live-vm-images 275 referred to in FIG. 1. As indicated in FIG. 2, a live-vm-image 275 for example may comprise two components, namely, a VM image level backup 280 and an IO journal, or simply, a journal, 290. For reference purposes, the image level backup 280 is shown in FIG. 2 as having been created at time 't' by, or at the direction of, an entity such as the backup agent 400 disclosed in FIG. 1. The image level backup 280 may be a crash-consistent backup.

As further shown in the illustrated example, the journal 290 may include both data and corresponding metadata for any number of IOs. In this particular example, six IOs are indicated, although any number of IOs can be captured in a journal 290. The particular number of IOs to be captured in the journal 290 may be specified, such as by providing "record the first six IOs after time t," and/or the number of IOs to be captured in the journal 290 may be specified based the passage of a particular period of time, for example, that "record all IOs for the time period from t to t+5 seconds." As disclosed elsewhere herein, the combination of the VM image level backup 280 and the journal 290 entries enables the spinoff of a VM that is application-consistent as of a particular point in time (PIT).

In view of the foregoing discussion, the journal 290 may be thought of as a stream, or streams, of data and metadata. For example, the journal 290 may comprise a stream of data, and a stream of corresponding metadata, and the two streams are kept in the journal 290 in association with each other and the corresponding IO. Thus, when the IOs in the journal 290 are applied to a full image VM backup, the metadata and data corresponding to each IO can be readily read out from the journal 290. In some embodiments, the journal 290 may comprise a single stream that includes both the data and associated metadata.

D. Comparative Example

The example of FIG. 3 discloses some example locations, namely, L1, L2, L3 and L4, of a backup 600, and the content or data present at those locations, namely, Q, X, Y, and Z, respectively. That is, the backup 600 includes the aforementioned data, in the aforementioned respective locations.

A journal 700 may be defined that spans a time period, for example, beginning at T0 and ending at T6. The time span defined by the journal 700 may be of any length but, in general, should be chosen long enough to provide assurance that the backup took place at some point during that time span. The journal 700 also indicates that various IOs are written to a disk, or other storage device, at different time during the timespan defined by the journal. Particularly, at time T0, the data 'A' is written to location L2, at T1, the data 'X' is written to L2, thus overwriting the data 'A.' At T2, data 'Q' is written to L1. At T3, data 'B' is written to L2, thus overwriting the data 'X.' At T4, the data 'C' is written to location L3. At T5, the data 'X' is written to L2, thus overwriting the data 'B.' Finally, at T6, the date 'D' is written to L2, thus overwriting the data 'X.'

Next, a classification scheme 800 is disclosed that, in general, provides at least some insight as to particularly when the backup was, or was not, taken. Recall from the earlier discussion that, at this point, it may only be known for certain that the backup was taken at some point during the time span defined by the journal. The classification scheme provides, for each location, information concerning what is known, or not, concerning the contents of that location at each of the times T1 through T6.

With reference first to location L1, it can be seen that an IO writes 'Q' to L1 at time T2, and that is the only IO to L1. Since the value of the backup for location L1 is Q, it may be concluded that the backup may have been taken any time subsequent to T2. However, there is not enough information available to determine what the data was that was stored in L1 prior to the IO that wrote 'Q' at T2. That data may have been the same as, or different from, 'Q.' Thus, as shown in the classification scheme 800, the data values for L1 at T0, T1, and T2, are classified as 'Unknown.'

Turning next to location L2, it can be seen that multiple IOs were written to L2 over the timespan defined by the journal 700. All of the times where the data in L2 is not 'X,' that is, the data in L2 does not match the L2 data in the backup. That is, the data 'A' at T0, 'B' at T3, and 'D' at T6 differ from the respective data included at L2 in the backup for those respective times. Thus, those times are classified 'Value does not match. Interval cannot be when backup was taken.' On the other hand, the classification scheme 800 indicates that L2 included data 'X' at times T1 and T5 and, accordingly, the content of L2 at those times matches the backup data. That is, the backup data indicates that L2 includes content 'X.' Because the L2 data 'X' for times T2 and T5 matches the backup data, it may be concluded that the backup could have been taken at T2 or T5. Finally, there is not enough information available to determine what the data was that was stored in L2 prior to the IO that wrote 'A' at T0. That data may have been the same as, or different from, 'A.' Thus, as shown in the classification scheme 800, the data value for L2 at T0 is classified as 'Unknown.'

With regard to example location L3, that location had only one IO, at T4, and the data 'C' of that IO is not 'Y,' that is, that data does not match the value 'Y' in the backup for L3. Therefore, it may be concluded that 'Y' had to be in the volume from before the beginning of the time segment until T4, when the IO was written for 'C.' Thus, it may be concluded that, as to L3 at least, the backup may have been taken any time between T0 and T4.

Finally, it can be seen that the journal 600 does not include any IOs for location L4. Thus, and with reference to the classification scheme 800, it may be concluded, that as to L4, the backup may have been taken any time during the time span defined by the journal 600.

With continued reference to the classification scheme 800, it can be seen that the backup may have been taken between T2 and T3, since the data of all the locations either matches, or has been concluded to match, the data in the same locations in the backup. Had this not been the case however, then the time after T1 is a possible candidate for when the backup may have been taken, as is the time before T0. Although, with the information at hand, it cannot be proven that the backup was taken at either of those times, there is no data that contradicts such a conclusion, although there is some information that is marked 'Unknown.' Further, it is known that the backup was taken sometime between T0 and T6, so it may be reasonable to conclude that the backup was taken either at T1 or before T0.

The discussion of the comparative example of FIG. 3 provides some useful insights. For example, there is no information available concerning the content of some locations at the given time interval before the first IO was received. The data there could be the same as the IO, or different, but there is no way to be sure. Further, this lack of information may compel a user such as an administrator to make a decision with less than all of the information needed. For example, it may be concluded that the backup was taken at T2 but, as noted, it is also possible that the backup was taken at T0 or before T1. There may be situations where the lack of knowledge, denoted by the 'Unknown' classification, might suggest that the backup was taken at T2, but if adequate knowledge was available, it may turn out to be the case that the backup was taken at another time instead.

E. Aspects of Some Example Embodiments

The points illustrated by the example of FIG. 3 may be addressed by one or more example embodiments. In general, in example embodiments, the journal is augmented with "undo" information when receiving an IO of a specific location for the first time in a timespan defined by the journal. This information enables an accurate determination of the content of the 'Unknown' areas and, accordingly, the resolution of all 'Unknown' classifications.

In general, the term "undo" information relates the data that was on the volume in a specific location before that location is overwritten. For example, a location L currently contains the data X. A new IO to location L contains the data Y. Before Y gets written to L, the old data is read from L, that is, the data X, and then Y gets written. The result is that location L has the new data Y, and the old data, that is, the undo data X, is preserved, although not in L. This terminology refers to the fact that writing "undo data" back into the same location L effectively reverts the previous write, that is, the IO that wrote 'Y.'

In operation, the undo data is retrieved and stored in the journal when the first write comes in at a location. To achieve this, either the splitter or the target that gets the IOs may keep track of when an IO is first written to a location in the journal. If it is the first time an IO is written to that location, the undo data is read and stored in the journal, followed by the new IO content. From then on in that location, there is no need for additional information. These functionalities will now be explained in more detail with reference to FIGS. 3 and 4.

For example, and with particular reference to FIG. 3, it was shown that 'Q' was written to L1 at T2 and remained in L1 from then on. However the data in L1 prior to the IO that wrote 'Q' was marked unknown because the data could have been any value, even 'Q.' There was simply not enough information available to make that determination. However, adding the undo data on the first IO to the location L1 in the journal tells exactly what the content was in L1 before that first IO, and therefore removes the uncertainty. As well, the implicit deductions 'Value concluded to match. Interval can be when backup was taken' need no longer be deductions, and now have a firm basis instead. Particularly, the undo data indicates what data was in a location L prior to the first IO to that location L in the journal.

As shown in the example of FIG. 4, and by way of comparison with FIG. 3, it can be seen that there is no longer any data classified 'Unknown' due to the collection and use of the undo data, as shown in the journal 700a. That is, all data is designated affirmatively as either matching the backup 600, or not matching the backup 600. This is indicated in the new classification 800a. It is also apparent from a comparison of FIGS. 3 and 4 that the backup can have been taken after T2, as shown in FIG. 3, or earlier, that is, after T1 as shown in FIG. 4. Thus, example embodiments may provide for a deterministic classification of the data and/or associated locations, and the resulting conclusion of where, in the timespan defined by journal 700a, the backup took place may also be deterministic.

With reference to the example architecture of FIG. 1, implementation of an embodiment of the invention may proceed as follows. Just before a backup is taken, an event is received, and the capture of IOs for the journal beings. Capture of the IOs should begin before the backup is actually created, so that assurance can be had that the backup will be taken at some point within the time interval of the journal. In some embodiments, IO capture may begin a fraction of a second before the backup is taken.

Tracking, such as through the use of a list or bitmap, for example, may be used to track what locations IOs are coming in, and to mark IOs coming in for the first time for a particular location. One or both of these processes may be performed by a suitable entity, examples of which include the IO Splitter 252, and the VRPA 254. If tracking is performed by the IO Splitter 252, the location is marked in the tracking and the IO Splitter 252 reads the undo and sends the undo data, followed by the new IO, to the journal. There may be a tag, such as a bit, in the IO metadata to tell the VRPA 254 if this is 'undo' data, that is, an undo IO, or a new IO. On the other hand, if tracking is performed by VRPA 254, when an IO is sent to the VRPA 254, the IO may not be acknowledged immediately. Instead, a read command may be sent from the VRPA 254 to the IO splitter 252 to read the undo data. After the undo data is received by the VRPA 254, the original IO may be acknowledged.

The first undo data and the new IOs are stored in the journal in sequence, as indicated in the example journal 700a of FIG. 4. In the classification, the value of the first IO may be used from the time of that IO forward until the time of the next IO, if any. The value of the undo data may be used for all times prior to the first IO.

F. Aspects of Some Example Methods

Figure 5:
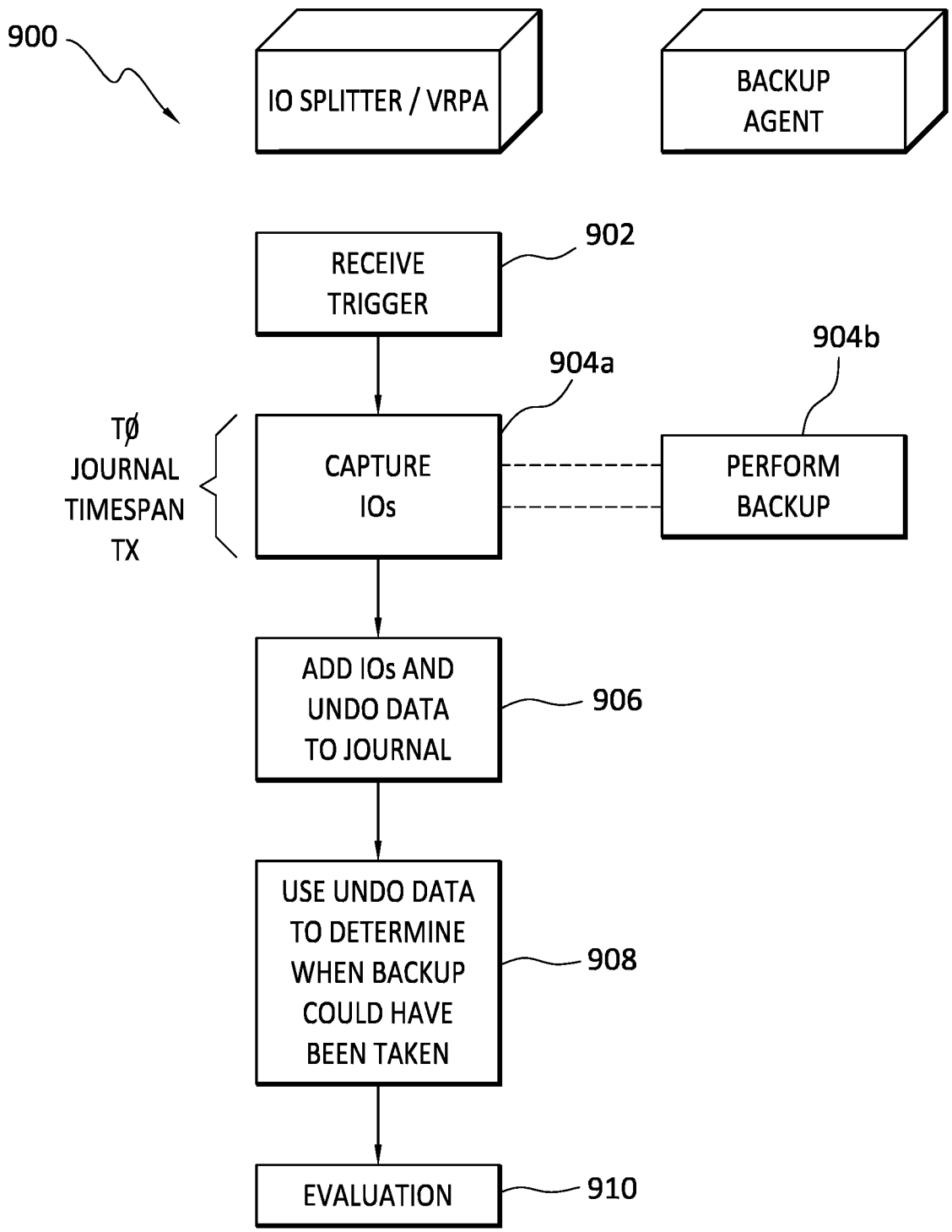
FIG. 5 discloses aspects of an example method.

With reference now to FIG. 5, details are provided concerning example methods according to some embodiments of the invention, where one example method is denoted generally at 900. In some embodiments, part or all of the method may be performed by an IO splitter and/or VRPA. Some embodiments of the invention may be performed in whole or in part by an agent, such as a live-vm-image agent for example. A backup portion of the method may be performed by, or at the direction of, a backup agent. The foregoing are provided only by way of example however, and the scope of the invention is not limited to performance of any particular method, or portion thereof, by any particular entity or entities.

The example method 900 may begin when a trigger is received 902, such as by an IO splitter or VRPA for example, that triggers the start of an IO capture process 904a. The trigger may be based on a particular time, the occurrence/non-occurrence of a particular event, or any other basis. The capture of IOs 904a may begin at some point prior to when a backup is to be taken 904b. The backup may be taken of data in a primary storage to which IOs are directed, for example, by one or more applications. The timespan during which IOs are captured 904a may be defined by a journal. For example, a journal may specify that IOs are to be captured during a timespan extending from T0 to TX, where X>1. As shown in the example of FIG. 5, the backup may be taken 904b sometime between T0 and TX, such that one or more IOs may be captured 904a before the backup is taken, and one or more IOs may be captured 904a after the backup is taken 904b.

The captured IOs may be added 906 to the journal. As well, undo information relating to the captured IOs may be added 906 to the journal. In general, the first time that an IO 'C' is written to a particular location 'L' on a disk, volume, or other storage, the data 'D' that was in that location 'L' prior to the writing of 'C,' that is, the undo data, is added to the journal along with the first IO 'C' to that particular location. Specifically, in this example, both 'D' (the undo data present in 'L' prior to the first IO) and 'C' (the first IO written to the location) are added to the journal, and may be stored together or otherwise associated with each other in the journal.

The IOs and undo data may be added 906 to the journal on the fly as IOs come in, or the IOs and undo data may be batched to the journal 906. In either case, once the timespan defined by the journal has run, the capture of IOs 904a may be terminated. The journal now contains the information necessary to enable a determination as to when, during the timespan defined by the journal, the backup was taken.

More specifically, the undo data, along with other information in the journal, may be used to determine 908 one or more times when the backup could have been taken. Correspondingly, the undo data and other information may enable a conclusive determination that a backup was not taken at one or more particular times within the timespan defined by the journal.

In general, the determination as to when a backup could have been taken may involve evaluation of the journal data, including the IOs and the undo data, to determine what data was written, to which location, and when. Among other things, and as disclosed elsewhere herein, examination of the undo information enables a determination as to what data was stored in a location 'L' before the first IO written to the journal for that location.

When the time, or times, when the backup could have been taken are determined 908, an evaluation may be performed 910. For example, if the backup time is about the same as, or subsequent to, a time when a problem was known to have been experienced elsewhere in the system, it may be decided that the backup may have been compromised in some way, and so should not be used. Another backup from a different time, such as before the problem occurred, may be used instead.

G. Further Example Embodiments

Following are some further example embodiments of the invention. These are presented only by way of example and are not intended to limit the scope of the invention in any way.

Embodiment 1. A method, comprising: capturing IOs; adding the IOs to a journal; adding undo data to the journal for one or more locations; and using the IOs and the undo data to determine when, during a timespan defined by the journal, a backup could have been taken.

Embodiment 2. The method as recited in embodiment 1, wherein the undo data comprises data that was in a location 'L' prior to writing of a first IO to that location 'L' during the timespan defined by the journal.

Embodiment 3. The method as recited in any of embodiments 1-2, wherein determining when the backup could have been taken comprises comparing data at various locations indicated in the backup with data that was present in those locations at some point during the timespan defined by the journal.

Embodiment 4. The method as recited in any of embodiments 1-3, wherein, for a location the undo data is added to the journal the first time that an IO is written to 'L' during the timespan defined by the journal.

Embodiment 5. The method as recited in any of embodiments 1-4, wherein the journal comprises, for one of the locations, the time when an IO was written to that location, and the content written to that location at that time.

Embodiment 6. The method as recited in any of embodiments 1-5, wherein determining when the backup could have been taken comprises creating a classification that indicates, for each of a plurality of locations identified in the backup, respective data that was present at those locations at each point in time within the timespan defined by the journal.

Embodiment 7. The method as recited in any of embodiments 1-6, wherein capturing the IOs comprises intercepting the IOs as the IOs are directed from an application to a primary storage entity.

Embodiment 8. The method as recited in any of embodiments 1-7, wherein IOs are captured only during the timespan defined by the journal.

Embodiment 9. The method as recited in any of embodiments 1-8, wherein IOs are captured before and after the backup was taken.

Embodiment 10. The method as recited in any of embodiments 1-9, wherein the backup is taken within the timespan defined by the journal.

Embodiment 11. A method for performing any of the operations, methods, or processes, or any portion of any of these, disclosed herein.

Embodiment 12. A non-transitory storage medium having stored therein instructions that are executable by one or more hardware processors to perform the operations of any one or more of embodiments 1 through 11.

H. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
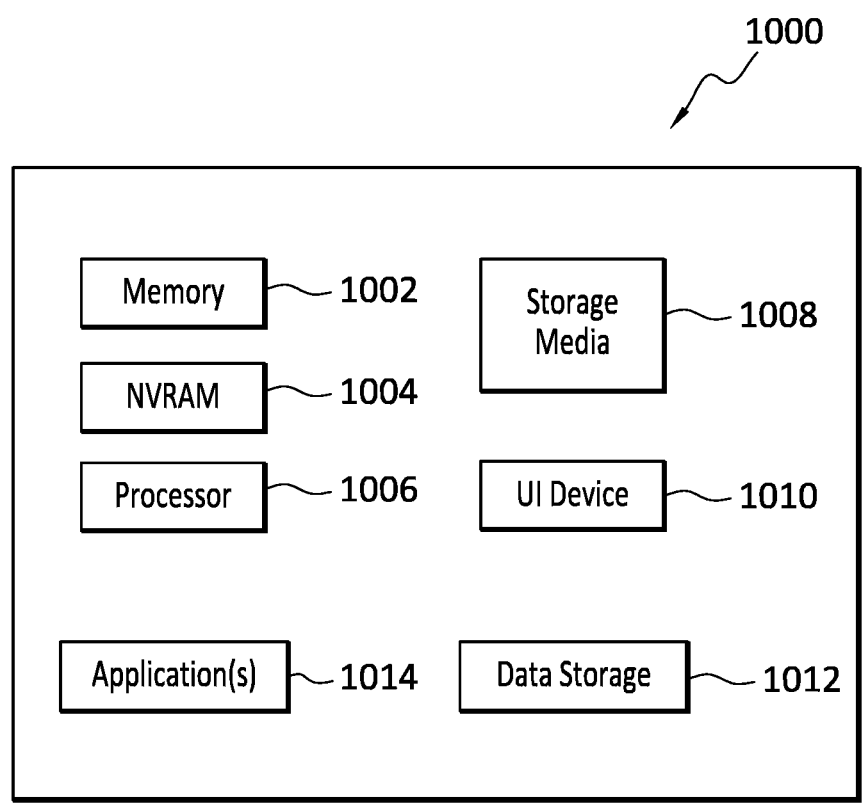
FIG. 6 discloses aspects of an example computing entity.

With reference briefly now to FIG. 6, any one or more of the entities disclosed, or implied, by FIGS. 1-5 and/or elsewhere herein, may take the form of, or include, or be implemented on, or hosted by, a physical computing device, one example of which is denoted at 1000. As well, where any of the aforementioned elements comprise or consist of a virtual machine (VM), that VM may constitute a virtualization of any combination of the physical components disclosed in FIG. 6.

In the example of FIG. 6, the physical computing device 1000 includes a memory 1002 which may include one, some, or all, of random access memory (RAM), non-volatile random access memory (NVRAM) 1004, read-only memory (ROM), and persistent memory, one or more hardware processors 1006, non-transitory storage media 1008, UI device 1010, and data storage 1012. One or more of the memory components 1002 of the physical computing device 1000 may take the form of solid state device (SSD) storage. As well, one or more applications 1014 may be provided that comprise instructions executable by one or more hardware processors 1006 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
capturing input/output (IOs), and the capturing comprises intercepting the IOs as the IOs are directed from a first entity to a second entity;
adding the IOs to a journal;
adding undo data to the journal for one or more locations;
comparing the journal to a backup to determine whether, in the backup, a particular location in the backup included an IO 'Y' or undo data 'X'; and
based on the comparing, determining when, during a timespan defined by the journal, the backup was taken, and the determining when the backup was taken comprises either:
creating a classification that indicates, for each of a plurality of locations identified in the backup, respective data that was present at those locations at each point in time within the timespan defined by the journal; or
when the comparing of the journal to the backup reveals that the particular location includes neither the IO 'Y' nor the undo data 'X', comparing IOs written subsequent to IO 'Y' with the backup to determine when the backup took place.

2. The method as recited in claim 1, wherein the undo data 'X' was in the particular location prior to writing of the IO 'Y' to that particular location during the timespan defined by the journal.

3. The method as recited in claim 1, wherein the backup is a live-vm-image that comprises a virtual machine (VM) image level backup and the journal.

4. The method as recited in claim 1, wherein, for the particular location, the undo data 'X' is added to the journal a first time that an input/output (IO) is written to the particular location during the timespan defined by the journal.

5. The method as recited in claim 1, wherein the first entity comprises an application and the second entity comprises a primary storage entity.

6. The method as recited in claim 1, wherein the IOs are captured only during the timespan defined by the journal.

7. The method as recited in claim 1, wherein the IOs are captured before and after the backup was taken.

8. The method as recited in claim 3, wherein the VM image level backup, and entries of the journal, together enable spinoff of a VM that is application-consistent as of a particular point in time (PIT).

9. A non-transitory storage medium having stored therein instructions that are executable by one or more hardware processors to perform operations comprising:
capturing input/output (IOs), and the capturing comprises intercepting the IOs as the IOs are directed from a first entity to a second entity;
adding the IOs to a journal;
adding undo data to the journal for one or more locations;
comparing the journal to a backup to determine whether, in the backup, a particular location in the backup included an IO 'Y' or undo data 'X'; and
based on the comparing, determining when, during a timespan defined by the journal, the backup was taken, and the determining when the backup was taken comprises either:
creating a classification that indicates, for each of a plurality of locations identified in the backup, respective data that was present at those locations at each point in time within the timespan defined by the journal; or
when the comparing of the journal to the backup reveals that the particular location includes neither the IO 'Y' nor the undo data 'X', comparing IOs written subsequent to IO 'Y' with the backup to determine when the backup took place.

10. The non-transitory storage medium as recited in claim 9, wherein the undo data 'X' was in the particular location prior to writing of the IO 'Y' to that particular location during the timespan defined by the journal.

11. The non-transitory storage medium as recited in claim 9, wherein the backup is a live-vm-image that comprises a virtual machine (VM) image level backup and the journal.

12. The non-transitory storage medium as recited in claim 9, wherein, for the particular location, the undo data 'X' is added to the journal a first time that an input/output (IO) is written to the particular location during the timespan defined by the journal.

13. The non-transitory storage medium as recited in claim 9, wherein the first entity comprises an application and the second entity comprises a primary storage entity.

14. The non-transitory storage medium as recited in claim 9, wherein the IOs are captured only during the timespan defined by the journal.

15. The non-transitory storage medium as recited in claim 9, wherein the IOs are captured before and after the backup was taken.

16. The non-transitory storage medium as recited in claim 11, wherein the VM image level backup, and entries of the journal, together enable spinoff of a VM that is application-consistent as of a particular point in time (PIT).

* * * * *